US012620376B2

(12) United States Patent
Sato et al.

(10) Patent No.: US 12,620,376 B2
(45) Date of Patent: May 5, 2026

(54) ELECTRONIC MUSICAL INSTRUMENT, ELECTRONIC MUSICAL INSTRUMENT SOUND EMISSION INSTRUCTING METHOD AND NON-TRANSITORY COMPUTER-READABLE RECORDING MEDIUM

(71) Applicant: CASIO COMPUTER CO., LTD., Tokyo (JP)

(72) Inventors: Hiroki Sato, Nishitokyo (JP); Hajime Kawashima, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 957 days.

(21) Appl. No.: 17/871,118

(22) Filed: Jul. 22, 2022

(65) Prior Publication Data

US 2023/0041040 A1 Feb. 9, 2023

(30) Foreign Application Priority Data

Aug. 3, 2021 (JP) ................................ 2021-127513

(51) Int. Cl.
*G10H 1/00* (2006.01)
*G10H 1/34* (2006.01)
*G10H 1/46* (2006.01)

(52) U.S. Cl.
CPC ........... *G10H 1/0008* (2013.01); *G10H 1/344* (2013.01); *G10H 1/46* (2013.01);
(Continued)

(58) Field of Classification Search
CPC ........ G10H 1/0008; G10H 1/344; G10H 1/46; G10H 2210/325; G10H 2210/571;
(Continued)

(56) References Cited

U.S. PATENT DOCUMENTS 5,229,533 A 7/1993 Sakurai
5,486,647 A * 1/1996 Kay ........................ G10H 1/38 84/DIG. 12

(Continued)

FOREIGN PATENT DOCUMENTS

JP H04235596 A 8/1992
JP H06250655 A 9/1994
JP 2015179229 A 10/2015

OTHER PUBLICATIONS

Extended European Search Report (EESR) dated Dec. 14, 2022, issued in counterpart European Application No. 22184252.9.

(Continued)

*Primary Examiner* — Jeffrey Donels
(74) *Attorney, Agent, or Firm* — Holtz, Holtz & Volek PC

(57) ABSTRACT

An electronic instrument includes a plurality of music-playing operators which designates pitch data in accordance with a music-playing operation and at least one processor which instructs a sound source which generates music sounds to emit sounds, in which the at least one processor, in a case where the music-playing operation meets a first instruction condition, instructs the sound source to emit the sound in a first sound emission form which corresponds to pitch data which meets the first instruction condition which is designated in accordance with the music-playing operation, and in a case where the music-playing operation meets a second instruction condition which is different from the first instruction condition, instructs the sound source to emit a sound which is different from the sound which is emitted in the first sound-emission form, that is, in a second sound-emission form which corresponds to pitch data which meets the second instruction condition which is designated in accordance with the music-playing operation.

10 Claims, 9 Drawing Sheets

(52) U.S. Cl.
CPC . *G10H 2210/325* (2013.01); *G10H 2210/571* (2013.01); *G10H 2220/221* (2013.01)

(58) Field of Classification Search
CPC ...... G10H 2220/221; G10H 1/18; G10H 1/34; G10H 1/38
See application file for complete search history.

(56) References Cited

U.S. PATENT DOCUMENTS

2011/0185882 A1 8/2011 Okuda
2021/0407474 A1* 12/2021 Sato ....................... G10H 1/057

OTHER PUBLICATIONS

Japanese Office Action (and an English language translation thereof) dated Jul. 4, 2023, issued in counterpart Japanese Application No. 2021-127513.

* cited by examiner

FIG. 5

| Group | Parameter | Value Range | Modify Parameter Presence/Absence | Modify Parameter Value Range |
|---|---|---|---|---|
| Wave Generator | Wave Set | 0 - 999 | Presence | 0 - 999 |
| Pitch | Pitch Coarse | -24 - +24 | Presence | -48 - +48 |
| | Pitch Fine | -50 - +50 | Presence | -100 - +100 |
| Pitch Envelope | Level 0 - 3 | -64 - +63 | Presence | -127 - +127 |
| | Rate 1 - 3 | 0 - 127 | Presence | -127 - +127 |
| Filter | Cutoff | 0 - 127 | Presence | -127 - +127 |
| | Resonance | 0 - 127 | Presence | -127 - +127 |
| Filter Envelope | Level 0 - 3 | -64 - +63 | Presence | -127 - +127 |
| | Rate 1 - 3 | 0 - 127 | Presence | -127 - +127 |
| Amp Envelope | Level 0 - 3 | 0 - 127 | Presence | -127 - +127 |
| | Rate 1 - 3 | 0 - 127 | Presence | -127 - +127 |
| Amp | Level | 0 -127 | Presence | -127 - +127 |
| Effect | Line | On/Off | Presence | On/Off |
| | Type | 0 - 9 | Absence | – |
| | Parameter 1 - 8 | 0 - 127 | Absence | – |
| System Effect | Chorus Send | 0 - 127 | Presence | -127 - +127 |
| | Delay Send | 0 - 127 | Presence | -127 - +127 |
| | Reverb Send | 0 - 127 | Presence | -127 - +127 |

ELECTRONIC MUSICAL INSTRUMENT, ELECTRONIC MUSICAL INSTRUMENT SOUND EMISSION INSTRUCTING METHOD AND NON-TRANSITORY COMPUTER-READABLE RECORDING MEDIUM

CROSS-REFERECE TO RELATED APPLICATION

The present application claims the benefit of priority of Japanese Patent Application No. 2021-127513 filed on Aug. 3, 2021 and all the contents of Japanese Patent Application No. 2021-127513 are incorporated into by reference the specification of the present application.

BACKGROUND

1. Field

The present disclosure relates to an electronic instrument, an electronic instrument sound emission instructing method and a non-transitory computer readable recording medium.

2. Related Art

In an electronic keyboard, there exists a so-called split function for playing the electronic keyboard by dividing the keyboard into left and right keyboard parts for two ranges by a split point and allocating mutually different tones to the left and right keyboard parts as disclosed, for example, in Japanese Patent Application Laid Open No. Hei4(1992)-235596.

SUMMARY

However, the split function has such a drawback that since the number of keys which is allocated to each range is reduced, the range which is available is limited.

Accordingly, the present disclosure makes it possible to achieve highly expressive music-playing in a plurality of ranges as one advantage.

According to one aspect of the present disclosure, there is provided an electronic instrument which includes a plurality of music-playing operators which designates pitch data in accordance with a music-playing operation and at least one processor which instructs a sound source which generates music sounds to emit sounds, in which the at least one processor, in a case where the music-playing operation meets a first instruction condition, instructs the sound source to emit the sound in a first sound emission form which corresponds to pitch data which does not meet the instruction condition which is designated in accordance with the music-playing operation, and in a case where the music-playing operation meets a second instruction condition which is different from the first instruction condition, instructs the sound source to emit a sound which is different from the sound which is emitted in the first sound-emission form, in a second sound-emission form which corresponds to pitch data which meets the second instruction condition which is designated in accordance with the music-playing operation.

BRIEF DESCRIPTION OF THE DRAWINGS

FIG. 5 is diagram illustrating one example of a list of data on tone parameters which are set for one tone in one embodiment of the present disclosure.

DETAILED DESCRIPTION

Figure 1:
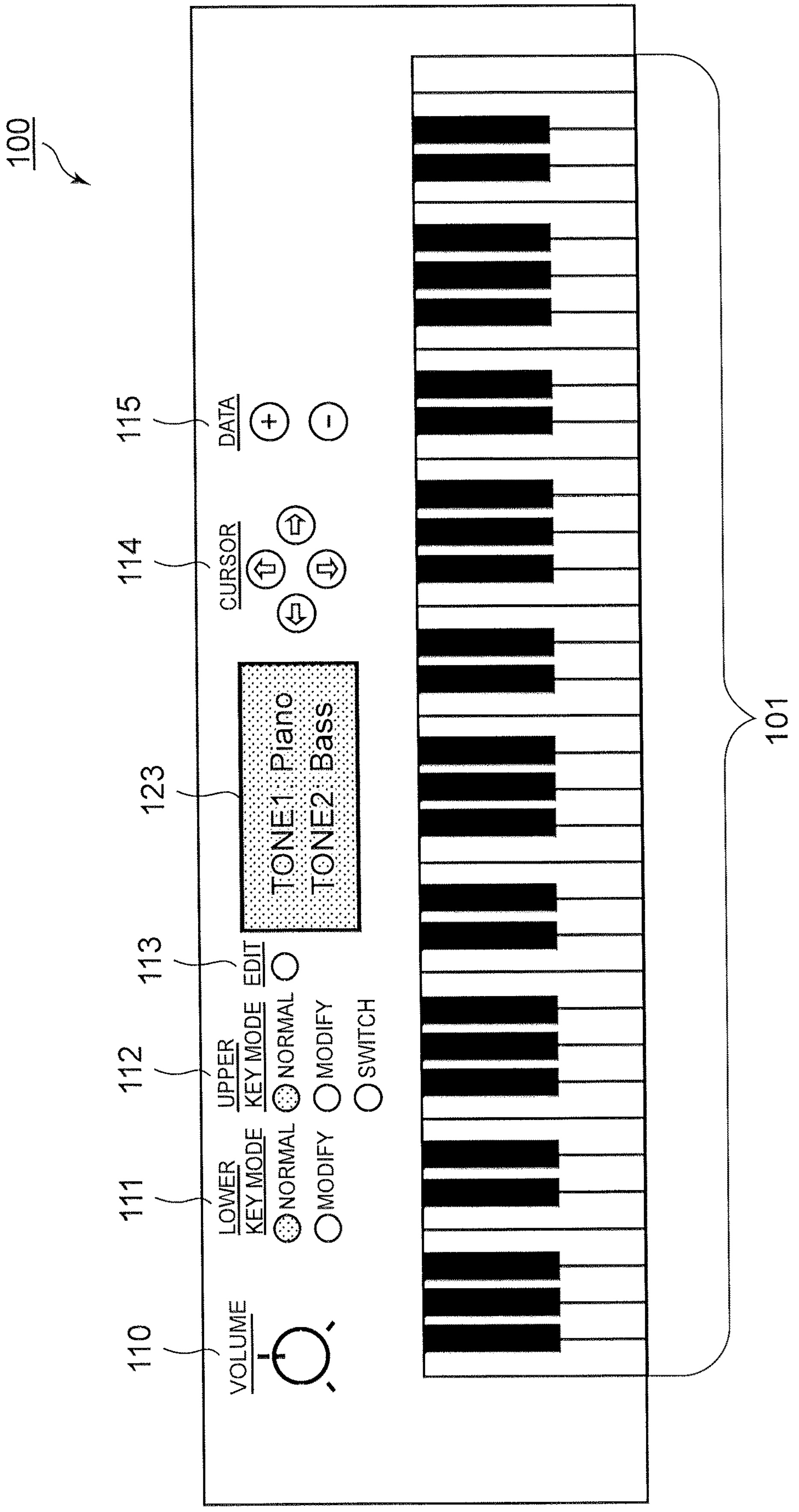
FIG. 1 is a diagram illustrating one example of an outer appearance of an electronic keyboard instrument (an electronic instrument) according to one embodiment of the present disclosure.

In the following, a mode for carrying out the present disclosure will be described in detail with reference to the drawings. FIG. 1 is a diagram illustrating one example of an outer appearance of an electronic keyboard instrument 100 according to one embodiment of the present disclosure. The electronic keyboard instrument 100 includes a keyboard 101 which is configured by keys which are a plurality (for example, 61) of music-playing operators, a VOLUME knob 110, a button group in a LOWER KEY MODE area 111, a button group in an UPPER KEY MODE area 112, an EDIT button 113, a CURSOR button group 114, a DATA button group 115 and an LCD (Liquid Crystal Display) 120 which displays various setting information. In addition, although not illustrated in FIG. in particular, the electronic keyboard instrument 100 also includes pitch bender/modulation wheels and so forth which are used for performing pitch bend and various modulations. In addition, although not particularly illustrated in FIG. 1, the electronic keyboard instrument 100 also includes loudspeakers which emit music sounds which are generated by music-playing on at least one of a back-face part, a side-face part, a rear-face part and so forth. Incidentally, the plurality of keys which configures the keyboard 101 is one example of the plurality of music-playing operators which is used to designate pitch data in accordance with the music-playing operation by the user.

The VOLUME knob 110 is adapted to adjust the volume of musical instrument sounds.

The LOWER KEY MODE area 111 is a button area which is used for selection of an operation mode of a lower key area in a case where the user plays the keyboard 101 in a state of splitting (dividing) the keyboard 101 into parts for two ranges and includes buttons which are described below. "NORMAL" button is used in a case where the user selects a normal playing mode (which will be described later). "MODIFY" button is used in a case where the user selects a tone modify mode (which will be described later. Only an LED (Light Emitting Diode) of one button which is selected from the above two buttons is turned on, the other mode is released and thereby the split mode is enabled. For releasing the split mode, the button that the LED is turned on is pushed again.

The UPPER KEY MODE area 112 is a button area which is used for selection of an operation mode of an upper key area in a case where the user plays the keyboard 101 in a split state and is used for selection of an operation mode of the entire key area in a case where the user plays the keyboard 101 in a not-split state and includes the following buttons. "NORMAL" button is used in a case where the user selects the normal playing mode. "MODIFY" button is used in a case where the user selects the tone modify mode. "SWITCH" button is used in a case where the user selects a tone switch mode (which will be described later). In a case where the tone switch mode is selected, a split function is released. Only the LED of one button which is selected from among the three buttons is turned on.

The "EDIT" button 113 is used to enter a state of editing a tone parameter. The "CURSOR" button 114 is used in a case where the user shifts an item to be selected in the screen of the LCD 120. The "DATA" button 115 is used in a case where the user increases an item value by pushing a "+" button and decreases the item value by pushing a "−" button.

"LOWER KEY MODE" which is designated in the LOWER KEY MODE area 111 and "UPPER KEY MODE" which is designated in the UPPER KEY MODE area 112 will be described later.

Figure 2:
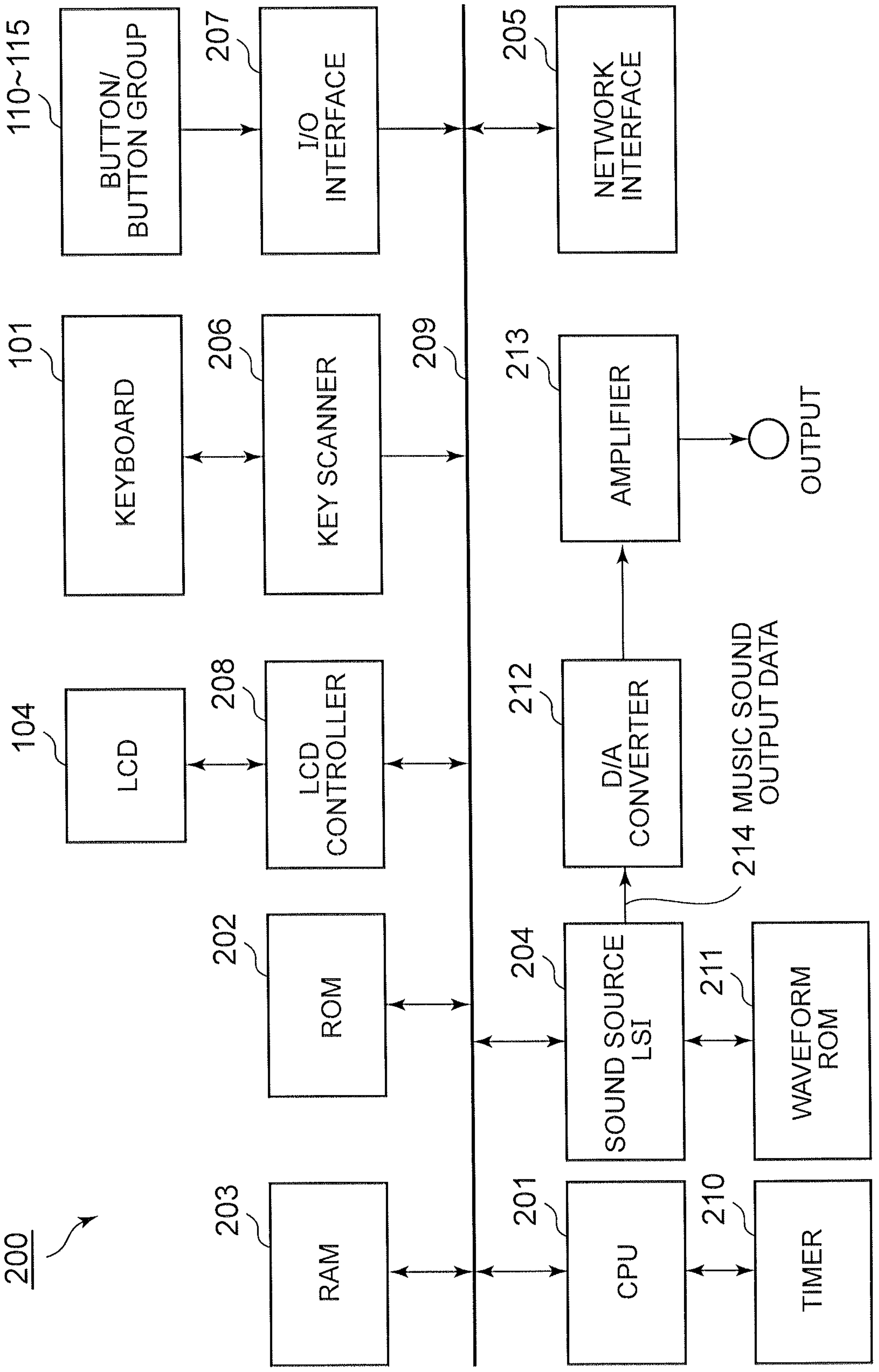
FIG. 2 is a block diagram illustrating one example of a hardware configuration of a control system in a main body of the electronic keyboard instrument according to one embodiment of the present disclosure.

FIG. 2 is a diagram illustrating one example of a hardware configuration of a control system 200 which is installed in the main body of the electronic keyboard instrument 100 according to one embodiment in FIG. 1. In FIG. 2, the control system 200 includes a CPU (Central Processing Unit) 201 which is a processor, a ROM (Read Only Memory) 202, a RAM (Random Access Memory) 203, a sound source LSI (Large Scale Integrated Circuit) 204 which is a sound source, a network interface 205, a key scanner 206 to which the keyboard 101 in FIG. 1 is connected, an I/O interface 207 to which the buttons 110 to 115 or the button groups in FIG. 1 are connected, an LCD controller 208 to which the LCD 120 in FIG. 1 is connected, a system bus 209, a timer 210, a waveform ROM 211, a D/A converter 212 and an amplifier 213. The CPU 201, the ROM 202, the RAM 203, the sound source LSI 204, the network interface 205, the key scanner 206, the I/O interface 207, and the LCD controller 208 are connected to the system bus 209 respectively. Music sound output data 214 which is output from the sound source LSI 204 is converted to an analog music sound output signal by the D/A converter 212. The analog music sound output signal is amplified by an amplifier 213 and is then output from a loudspeaker or an output terminal which is not particularly illustrated in FIG. 2. In addition, the control system 200 may also include a processor such as a DPU (Data Processing Unit) other than the above.

The CPU 201 executes a control program which is stored in the ROM 202 while using the RAM 203 as a work memory and thereby executes a control operation of the electronic keyboard instrument 100 in FIG. 1.

The key scanner 206 stationarily scans a key-pressed/key-released state of each key on the keyboard 101 in FIG. 1, causes a keyboard event interrupt to occur and thereby informs the CPU 201 of change of the key-pressed state of each key on the keyboard 101. In a case where a key is pressed as a keyboard event, the CPU 201 executes keyboard event processing which will be described later by using a flowchart in FIG. 7 or FIG. 8. In the keyboard event processing, in a case where key-pressing occurs as the keyboard event, the CPU 201 instructs the sound source LSI 204 to emit a first-tone-based or second-tone-based music sound which corresponds to pitch data on a newly pressed key.

The I/O interface 207 detects operation states of the buttons or the button groups 110 to 115 in FIG. 1 and informs the CPU 201 of a result of detection.

The timer 210 is connected to the CPU 201. The timer 210 makes the interrupt occur at regular time intervals (for example, every one millisecond). In a case where the interrupt occurs, the CPU 201 executes elapsed-time monitoring processing which will be described later by using a flowchart in FIG. 9. In the elapsed-time monitoring processing, the CPU 201 decides whether a predetermined playing operation is executed by the user on the keyboard 101 in FIG. 1. For example, in the elapsed-time monitoring processing, the CPU 201 decides whether a music-playing operation which is carried out by the user by using the plurality of keys on the keyboard 101 is a chord playing operation. More specifically, in the elapsed-time monitoring processing, the CPU 201 measures an elapsed time between the previously described keyboard events which are generated from the key scanner 206 for reasons that any one of the keys on the keyboard 101 in FIG. 1 is pressed. Thereby the CPU 201 decides whether the number of keys which are regarded to be simultaneously pressed reaches the number of sounds for establishment of the chord playing which is set in advance within the elapsed time which is set in advance. Then, in a case where it is decided that the number of the pressed keys reaches the number of the sounds for establishment of the chord playing, the CPU 201 instructs the sound source LSI 204 to emit the second-tone-based music sound which corresponds to a pitch data group which configures the chord of the keys which are pressed within the elapsed time. The CPU 201 sets that the chord is being emitted together with instruction issuance to the sound source LSI 204. An operation that the CPU 201 performs while the chord is being emitted will be described later.

The LCD controller 208 is an integrated circuit which controls a display state on the LCD 120 in FIG. 1.

The network interface 205 is connected to a communication network such as, for example, a LAN (Local Area Network) and so forth and receives control programs (see flowcharts of later-described keyboard event processing in FIG. 7 or FIG. 8 and elapsed time monitoring processing in FIG. 9) and/or data that the CPU 201 uses from an external device. Thereby, it becomes possible for the user to load the received control programs and/or data to the RAM 203 and so forth and then to use the received control programs and/or data.

Figure 3:
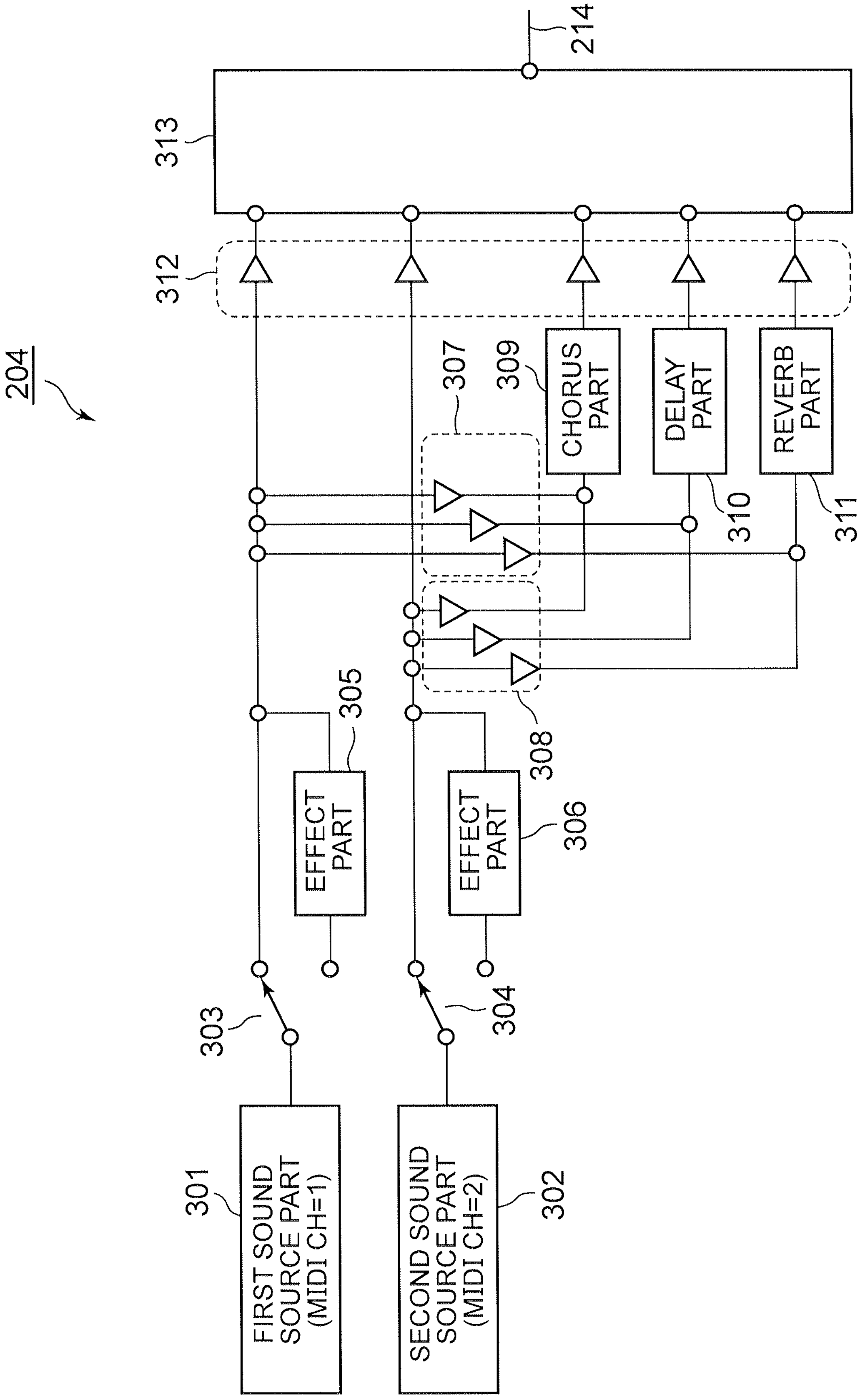
FIG. 3 is a block diagram illustrating one example of an entire configuration of a sound source LSI (Large Scale Integration) of the electronic keyboard instrument according to one embodiment of the present disclosure.

FIG. 3 is a block diagram illustrating one example of the entire configuration of the sound source LSI 204 in FIG. 2. The sound source LSI 204 includes a first sound source part block 301 and a second sound source part block 302.

It is possible to output music sound waveform data which is output from the first sound source part block 301 as it is as part of the music sound output data 214 via a switch 303, a multiplier group 312 and a mixer part 313. As an alternative, it is also possible to add any one of sound effects such as the compressor effect, the distortion effect, the overdrive effect and the flanger effect by an effect part 305 which is an insertion effect part which is serially connected to the sound source LSI 204 by changing-over of the switch 303. The first sound source part block 301 is allocated to, for example, an MIDI (Musical Instrument Digital Interface) channel 1 (in FIG. 3, denoted as "MIDI CH=1").

It is possible to output music sound waveform data which is output from the second sound source part block 302 as it is as part of the music sound output data 214 via a switch 304, the multiplier group 312 and the mixer part 313. As an alternative, it is also possible to add any one of sound effects which are the same as the sound effects which are brought about by the effect part 305 by an effect part 306 which is an insertion effect part which is serially connected to the sound source LSI 204 by changing-over of the switch 304. However, it is possible to set tone parameters which control the effect part 305 and the effect part 306 to parameters that mutually different sound effects are added to the effect part 305 and the effect part 306 respectively. The second sound source part block 302 is allocated to, for example, a MIDI channel 2 (in FIG. 3, denoted as "MIDI CH=2").

Music sound waveform data (which also contains data which passes through the effect part 305) which is derived from the first sound source part block 301 and music sound waveform data (which also contains data which passes through the effect part 306) which is derived from the second sound source part block 302 are mixed by multiplier groups 307 and 308 individually to a chorus part 309, a delay part 310 or a reverberation part 311 each of which a system effect part at an optional volume and are added with three kinds of individual effects in the chorus part 309, the delay part 310 and the reverberation part 311 and then it becomes possible to output the data as part of the music sound output data 214 via a multiplier group 312 and a mixer part 313.

Figure 4:
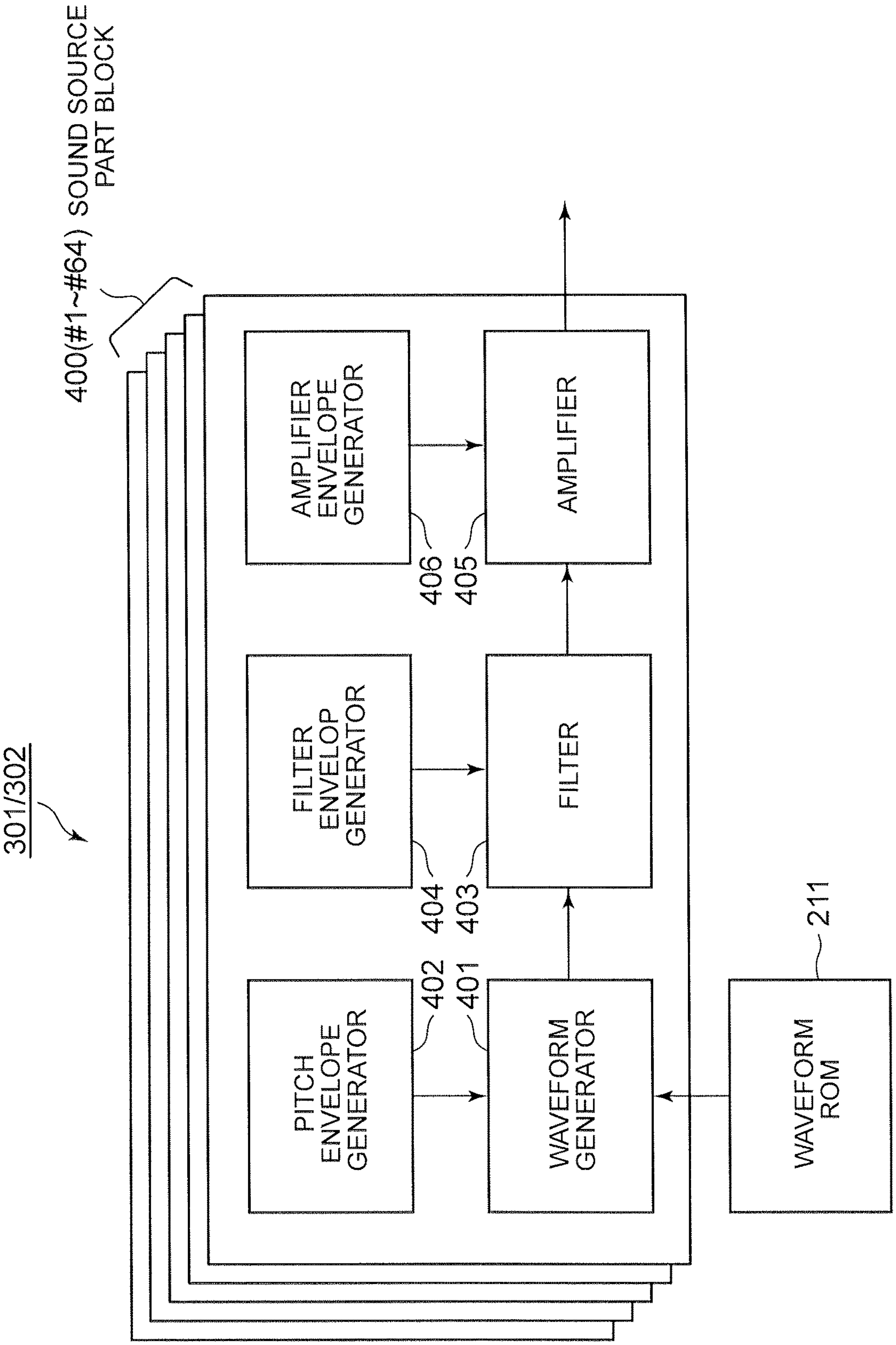
FIG. 4 is a configuration diagram illustrating one example of a sound source part of the sound source LSI.

FIG. 4 is a diagram illustrating one example of a configuration of a sound source part block 400 which is common to the first sound source part block 301 and the second sound source part block 302 in FIG. 3. The first sound source part block 301 and the second sound source part block 302 share 64 (#1 to #64) sets of sound source part blocks 400 which are illustrated in FIG. 4 and it is possible to allocate the first sound source part block 301 and the second sound source part block 302 to any one or more sets of the 64 sets (#1 to #64) of the sound source part blocks 400 as many as possible. Incidentally, in the hardware configuration of the sound source LSI 204, functions of the 64 sets (#1 to #64) of the sound source part blocks 400 are generated as virtual blocks by execution of software-based time-division processing.

A waveform generator 401 reads a music sound waveform out of the waveform ROM 211 in FIG. 2 at a read-out speed which corresponds to a pitch of a sound whose emission is designated from the CPU 201 and generates music sound waveform data.

A filter 403 filters out the music sound waveform data in accordance with a filter parameter which changes with a change in time that envelope data that a filter envelope generator 404 generates indicates and thereby processes the tone of the music sound.

An amplifier 405 modulates an amplitude of the music sound waveform data in accordance with the amplitude which changes with a change in time that envelope data that an amplifier envelope generator 406 generates indicates.

The music sound waveform data is output from the sound source part block 400 passing through the waveform generator 401, the filter 403 and the amplifier 405.

In accordance with a mute instruction which is issued from the CPU 201, the sound source part block 400 suspends reading of the music sound waveform data which applies to the mute instruction out of the waveform ROM 211 and terminates sound emission of the music sound in response to the mute instruction.

Examples of operations of the electronic keyboard instrument 100 in FIG. 1 and the control system 200 in FIG. 2 in one embodiment of the present disclosure will be described.

First, the electronic keyboard instrument 100 according to one embodiment has the following functions as functions which relate to the keyboard 101 in FIG. 1.

(1) Splitting Function

The splitting function makes it possible to divide a key area of the keyboard 101 in FIG. 1 into two key areas which are referred to as a "Lower" key area which is a lower-side key area and an "Upper" key area which is an upper-side key area and thereby to play the keyboard 101 by allocating mutually different sound source part blocks to the "Upper" key area and the "Lower" key area. In a case where any one of settings is made in the LOWER KEY MODE area 111 in FIG. 1, a split mode is automatically set. In a case where all the settings are released in the LOWER KEY MODE area 111 in FIG. 1 (in a case where all the LEDs are turned off) or in a case where the "SWITCH" button is pushed in the UPPER KEY MODE area 112 in FIG. 1 (in a case where the LED of the "SWTCH" button is turned on), the split mode is released. In the split mode, the "Upper" key area is allocated to the first sound source part block 301 in FIG. 3 and the "Lower" key area is allocated to the second sound source part block 302 in FIG. 3 respectively.

(2) Normal Sound Emission Function

In the normal sound emission function, in a case where the splitting function is not allocated, that is, in a case where nothing is set in the LOWER KEY MODE area 111 and a "NORMAL" button is pushed in the UPPER KEY MODE area 112, a sound emission instruction which is based on key pressing in the entire key area of the keyboard 101 in FIG. 1 is allocated to the first sound source part block 301 (in FIG. 3) in the sound source LSI 204 in FIG. 2. Then, a first-tone-based normal sound which is generated on the basis of a tone parameter setting which is set in advance by the user to the music sound waveform data that the first sound source part block 301 generates is emitted in response to an optional key pressing operation that the user performs by pressing an optional key in the entire key area.

In this connection, the tone parameter setting that the user sets in advance includes a change-over setting of the switch 303, a setting of any one of such sound effects as the compressor effect, the distortion effect, the over-drive effect and the flanger effect which are brought about by the effect part 305, a setting of each multiplication coefficient of the multiplier group 307, a setting of each of the chorus part 309, the display part 310 and the reverb part 311 which are the system effects and a setting of each multiplication coefficient of the multiplier group 312 in FIG. 3.

In addition, the tone parameter setting includes settings of a pitch envelope generator 402, the filter envelope generator 404 and the amplifier envelope generator 406 in the sound source part blocks 400 (in FIG. 4) which are allocated to the first sound source part block 301.

In a case where the splitting function is allocated, that is, the "NORMAL" button is set in the LOWER KEY MODE area 111 and the "NORMAL" button is pushed also in the UPPER KEYMODE area 112, a sound emission instruction which is based on key pressing in the "Upper" key area of the keyboard 101 in FIG. 1 is allocated to the first sound source part block 301 and a sound emission instruction which is based on key-pressing in the "Lower" key area of the keyboard 101 is allocated to the second sound source part block 302.

Then, the first-tone-based normal sound which is generated on the basis of the tone parameter setting (which is the same as the case of the parameter setting to the first sound source part block 301 in a case where the splitting function is not allocated to the keyboard 101 in the normal sound emission function (2)) which is set in advance by the user for the music sound waveform data that the first sound source part block 301 generates is emitted in response to an optional key-pressing operation that the user performs on an optional key in the "Upper" area.

In addition, the first tone-based normal sound which is generated on the basis of the tone parameter setting which is set in advance by the user for the music sound waveform data that the second sound source part block 302 generates is emitted in response to an optional key-pressing operation that the user performs on an optional key in the "Lower" key area.

Here, the tone parameter setting that the user sets in advance for the music sound waveform data that the second sound source part block 302 generates includes a setting of changing over the switch 304, a setting of any one of such sound effects as the compressor effect, the distortion effect, the over-drive effect and the flanger effect which are brought about by the effect part 306, a setting of each multiplication coefficient of each multiplier in the multiplier group 308, the setting of the chorus part 309, the delay part 310 or the reverb part 311 each of which is the system effect part and the setting of each multiplication coefficient of each multiplier in the multiplier group 312. In addition, the pitch envelope generator 402, the filter envelope generator 404 and the amplifier envelope generator 406 are included as the tone parameters which are settable.

In addition, the tone parameter setting includes settings of the pitch envelope generator 402, the filter envelope generator 404 and the amplifier envelope generator 406 in the sound source part blocks 400 (in FIG. 4) which are allocated to the second sound source part block 302.

(3) Tone Modification Function

The tone modification function is used for setting a tone modification mode. In a case where the splitting function is not allocated, that is, in a case where noting is set in the LOWER KEY MODE area 111 and the "MODIFY" button is pushed in the UPPER KEY MODE area 112, a sound emission instruction which is based on key-pressing in the entire key area of the keyboard 101 in FIG. 1 is allocated to the first sound source part block 301.

In the tone modification function (3), as will be described later with reference to FIG. 6, in a case where simultaneous key-pressing is recognized on optional keys in the entire key area, with regard to cord-configuring sounds that simultaneous key-pressing is recognized, in the tone parameters which are settable for the music sound wave form data that the first sound source part block 301 generates (the same as the case of the parameter setting to the first sound source part block 301 in the case where the splitting function is not allocated in the normal sound emission function (2)), the setting of the predetermined tone parameter that the user selects is modified (changed) to a tone parameter setting for the chord which is different from the tone parameter setting for the normal sound. Thereby, the first tone which is generated on the basis of the tone parameter setting for the normal sound is modified to the second tone which is generated on the basis of the tone parameter setting for the chord for the music sound waveform data which is output from the first sound source part block 301. As a result, the normal sound is emitted as first-tone-based music sound waveform data which is output from the first sound source part block 301 and the chord-configuring sounds that simultaneous key-pressing is recognized are emitted as second-tone-based music sound waveform data which is output from the first sound source part block 301.

In the tone modification function (3), in a case where the splitting function is allocated, that is, in a case where the "MODIFY" button is pushed in at least either the LOWER KEY MODE area 111 or the UPPER KEY MODE area 112, the sound emission instruction which is based on key-pressing in the "Upper" key area on the keyboard 101 in FIG. 1 is allocated to the first sound source part block 301 and the sound emission instruction which is based on key-pressing in the "Lower" key area on the keyboard 101 is allocated to the first sound source part block 301.

In the tone modification function (3), for example, in a case where the "MODIFY" button is pushed in the LOWER KEY MODE area 111, and as will be described later with reference to FIG. 6, in a case where the simultaneous key-pressing is recognized on optional keys in the "Lower" key area, with regard to the chord-configuring sounds that the simultaneous key-pressing is recognized, the setting of the predetermined tone parameter that the user selects in the tone parameters which are settable for the music sound wave form data that the second sound source part block 302 generates (the same as the case of the parameter setting to the second sound source part block 302 in the case where the splitting function is allocated in the normal sound emission function (2)) is modified (changed) to the tone parameter setting for the chord which is different from the tone parameter setting for the normal sound. Thereby, for the music sound waveform data which is output from the second sound source part block 302, the first tone which is generated on the basis of the tone parameter setting for the normal sound is modified to the second tone which is generated on the basis of the tone parameter setting for the chord. As a result, the normal sound is emitted as the first-tone-based music sound waveform data which is output from the second sound source part block 302 and the chord-configuring sounds that simultaneous key-pressing is recognized are emitted as the second-tone-based music sound waveform data which is output from the second sound source part block 302.

On the other hand, in a case where the "MODIFY" button is pushed, for example, in the UPPER KEY MODE area 112 in the tone modification function (3), and as will be described later with reference to FIG. 6, in a case where simultaneous key-processing is recognized on optional keys in the Upper key area, with regard to the chord-configuring sounds that simultaneous key-pressing is recognized, the setting of the predetermined tone parameter that the user selects in the tone parameters which are settable for the music sound waveform data that the first sound source part block 301 generates (the same as the case of the parameter setting to the first sound source 301 in the case where the splitting function is not allocated in the normal sound emission function (2)) is modified (changed) to the tone parameter setting for the chord which is different from the tone parameter setting for the normal sound. Thereby, for the music sound waveform data which is output from the first sound source part block 301, the first tone which is generated on the basis of the tone parameter setting for the normal sound is modified to the second tone which is generated on the basis of the tone parameter setting for the chord. As a result, the normal sound is emitted as the first-tone-based music sound waveform data which is output from the first sound source part block 301 and the chord-configuring sounds that simultaneous key-pressing is recognized are emitted as the second-tone-based music sound waveform data which is output from the first sound source part block 301.

In one embodiment of the present disclosure, in a case where a key for one normal sound is pressed, it becomes possible to emit the music sound with the first tone which is set in each key area and in a case where the simultaneous key-pressing is performed, it becomes possible to emit the music sound with the second tone which is different from the first tone which is set in each key area, in the entire key area in a case where the splitting function is not set or in either the "Lower" key area or the "Upper" key area in a case where the splitting function is set in the above-mentioned way.

(4) Tone Switching Function

The tone switching function is used for setting a tone switching mode. In a case where the "SWITCH" button is pushed in the UPPER KEY MODE area 112 in FIG. 1, a sound emission instruction which is issued by pushing the "SWITCH button is allocated to either the first sound source part block 301 or the second sound source part block 302 depending on whether key-pressing in the entire key area of the keyboard 101 in FIG. 1 is performed to instruct sound emission by pressing the key for normal sound or to instruct sound emission which is based on key-pressing for the chord by simultaneous key-pressing.

In the tone switching function (4), as will be described later with reference to FIG. 6, in a case where simultaneous key-pressing is recognized on the optional keys in the entire key area, with regard to the chord-configuring sounds that simultaneous key-pressing is recognized, the second-tone-based music sound which is generated on the basis of the tone parameter setting (the same as the case of the parameter setting to the second sound source part block 302 in a case where the splitting function is allocated in the normal sound emission function (2)) which is set in advance by the user for the music sound waveform data that the second sound source part block 302 generates is emitted.

On the other hand, in the tone switching function (4), with regard to the configuring sounds which correspond to key-pressing which is not recognized as simultaneous key-pressing, the first-tone-based music sound which is generated on the basis of the tone parameter setting (the same as the case of the parameter setting to the first sound source part block 301 in a case where the splitting function is not allocated in the normal sound emission function (2)) which is set in advance by the user for the music sound waveform data that the first sound source parameter block 301 generates is emitted.

Incidentally, in a case where the tone switching function (4) is used, since both the first sound source part block 301 and the second sound source part block 302 are exclusively used, the splitting function is disabled.

FIG. 5 is a diagram illustrating one example of a list of tone parameter data which are set to one tone in one embodiment of the present disclosure. An element which decides each tone is set on the basis of tone parameters. In one embodiment, with respect to the music sound which is detected as the simultaneously key-pressed chord while the tone modification function (3) is being enabled, for a tone parameter that a value of the item "Modify Parameter Presence/Absence" is set to "Presence" in tone parameters of respective rows in FIG. 5, a value for the normal sound which is set in the item "Value Area" is modified to a value for the chord which is set in the item "Modify Parameter Value Area".

As a modification operation, there exist a modification operation for value addition and a modification operation for replacement of one value with another value.

In the modification operation for replacement of one value with another value, there exist a "Wave Set" which is a parameter (a waveform number) of "Wave Generator" (the waveform generator 401 in FIG. 4) in FIG. 5 and "On/Off" which is a parameter (On/Off of the switch 303 or 304 in FIG. 3) of "Effect Line". In the modification operations of these tone parameters, a value of the item "Value Range" is replaced with a value of the item "Modify Parameter Value Range".

In the modification operations of other tone parameters in FIG. 5, the value of the item "Modify Parameter Value Range" is added to the value of the item "Value Range".

In addition, for a tone parameter modification of which is not easy with the use of "Modify Parameter Value Range", "Absence" is set in the item "Modify Parameter Presence/Absence". The items "Effect Type" and "Effect Parameter" are examples of "Absence" setting. This is because since use of only one kind of "Effect" is allowed for one sound source part block, coexistence of two or more kinds of "Effect" is not easy.

A decision condition for chord playing for starting second-tone-based sound emission which corresponds to the chord is that chord playing which is achieved by pressing keys of N or more sounds almost simultaneously (within T seconds) is carried out. In a case where establishment of the condition is decided, the keyboard 101 enters the state where the chord is being emitted until all the keys which correspond to key-pressing which is decided that the condition for the chord playing is established are released, an instruction to emit the second-tone-based music sound which is generated by pressing only the keys which establish the chord at a point in time that the decision is made is issued to the sound source LSI 204 and the output data 214 on the second-tone-based music sound is sent from the sound source LSI 204.

As one example of a sound emission form, it is possible to emit the sound by automatic arpeggio playing which is carried out by using only the chord configuring sounds that simultaneous key-pressing is decided (for example, broken-line sections which range from timings that the state where the chord is being emitted is set to right-end white circles in, for example, key-pressing events t4, t5 and t6 which will be described later with reference to FIG. 6).

In the state where the chord is being emitted, even in a case where some of the keys which are decided to be pressed simultaneously are released and the number of sounds which configure the chord becomes less than N, the state where the chord is being emitted is maintained. In a case where all the keys which are decided to be pressed simultaneously are released, the state where the chord is being emitted is released.

In addition, in a case of once entering the state where the chord is being emitted, no matter how hard the user performs any other key-pressing operation, a music sound of a pitch which corresponds to novel key-pressing is emitted with the first tone as the normal sound and is not emitted with the second tone which corresponds to the chord while the state where the chord is being emitted is maintained.

N (the number of sounds which establishes chord playing) and T (an elapsed time that the keys are regarded to be simultaneously pressed) may be set for every tone.

Figure 6:
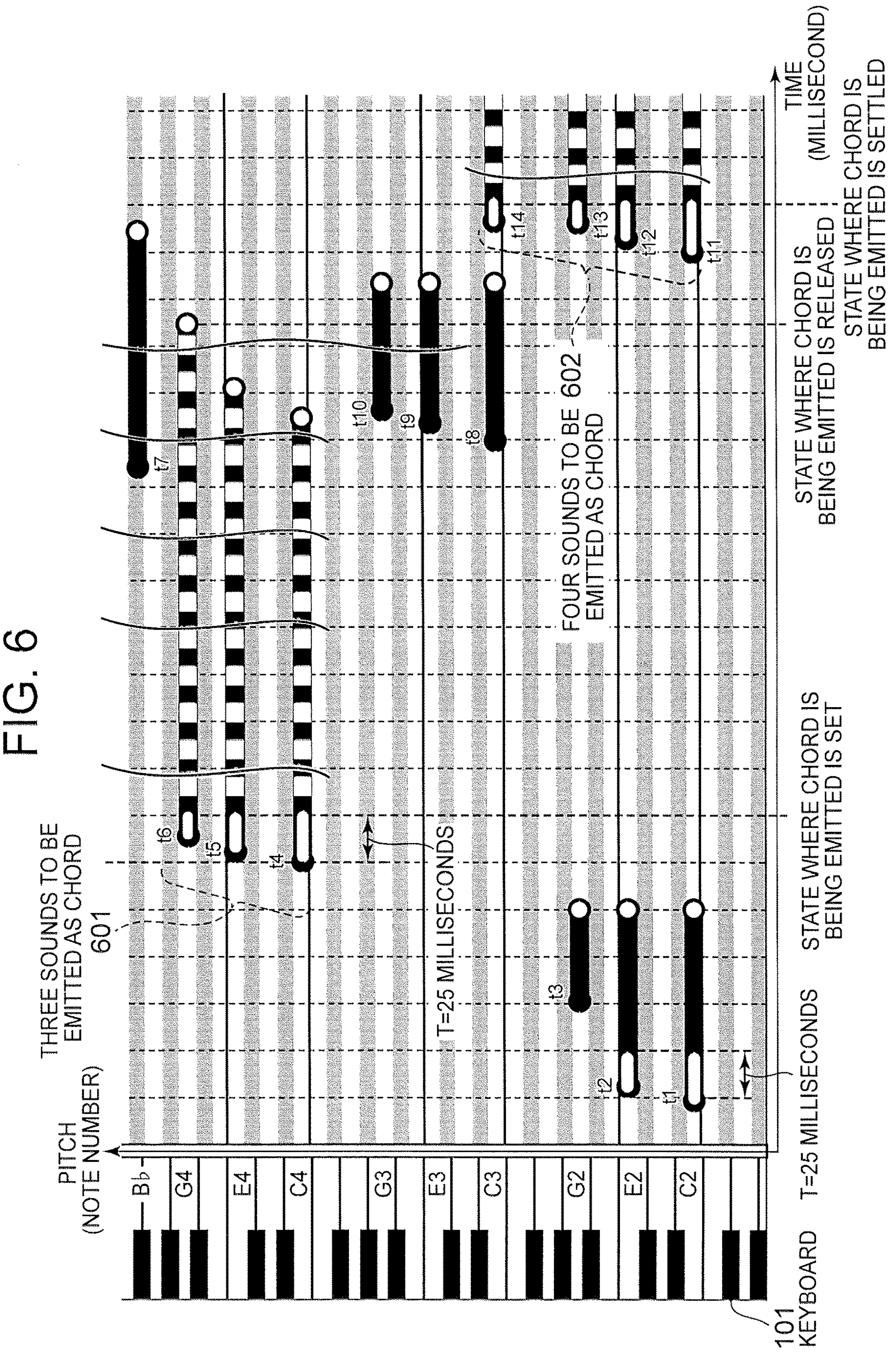
FIG. 6 is an explanatory diagram illustrating one example of operations of the electronic keyboard instrument according to one embodiment of the present disclosure.

FIG. 6 is an explanatory diagram illustrating one example of operations of the electronic keyboard instrument 100 according to one embodiment of the present disclosure. The vertical axis indicates the pitches (note numbers) which are played in the form of the keyboard 101 and the horizontal axis indicates the elapsed time (milliseconds in unit). A black circle or a blanked black circle which is located at each left end indicates the note number of each key and a time that key-pressing occurs. A white circle which is located at each right end indicates the note number of each key and a time that key-releasing occurs. Numbers t1 to t14 are assigned to key-pressing events in order in FIG. 6 by way of example. Each of black solid lines which follow the black circle or the blanked black circle and a blanked black solid line indicates that the key is being pressed and indicate a section that the first-tone-based music sound for the normal sound is being emitted. In addition, a part which is changed to a gray broken line indicates a section that the second-tone-based music sound for the chord is being emitted. In the example in FIG. 6, the elapsed time T that it is regarded that simultaneous key-pressing is carried out is set to, for example, 25 msec (milliseconds) and N (the number of sounds which establishes the chord playing) is set to, for example, 3 or more sounds.

First, in a case where the key-pressing event t1 occurs under a situation that the state where the chord is being emitted is released, for example, a pitch C2 is stored and emission of the sound of the pitch C2 is once put on hold (a blanked solid-line section of the key-pressing event t1) and measurement of the elapsed time is started. Then, the key-pressing event t2 occurs within, for example, 25 milliseconds after occurrence of the key-pressing event t1, a pitch E2 is stored and emission of the sound of the pitch E2 is once put on hold (a blanked solid-line section of the key-pressing event t2). Then, although the key-pressing event t3 occurs subsequently, the key-pressing event t3 occurs more than, for example, 25 milliseconds later after occurrence of the key-pressing event t1. The number of keys which are regarded to be pressed simultaneously at a point in time that the elapsed time T (=, for example, 25 milliseconds) passes after occurrence of the key-pressing event t1 is, for example, 2, that is, N (the number of sounds which establishes the chord playing)=less than, for example, 3. In this case, the music sound which is based on the second tone for the chord does not generate for the key-pressing events t1, t2 and t3 and only the first-tone-based music sound for the normal sound is emitted in sections which are indicated by respective black solid lines of the key-pressing events t1, t2 and t3 (that is, does not meet an instruction condition).

Then, a key-pressing event t4 occurs, a pitch C4 is stored and emission of the sound of the pitch C4 is once put on hold (a blanked solid-line section of the key-pressing event t4) and measurement of the elapsed time is again started. Then, key-pressing events t5 and t6 occur within the elapsed time T (=, for example, 25 milliseconds) after occurrence of the key-pressing event t4 that it is regarded that keys are pressed simultaneously, pitches E4 and G4 are respectively stored and emission of the respective sounds of the pitches E4 and G4 is once put on hold (blanked solid-line sections of the key-pressing events t5 and t6). As a result, the number of music sounds at the point in time that T (=, for example, 25 millisecond) has elapsed after occurrence of the key-pressing event t4 is increased to 3 and meets a condition (=the instruction condition) that N (the number of sounds which establishes the chord playing)=, for example, 3 or more. In this case, for the key-pressing events t1, t2 and t3 as indicated by gray broken lines, a second-tone-based music sound for a chord of three sounds of the pitches C4, E4 and G4 is emitted (601 in FIG. 6). In addition, the state where the chord is being emitted is set.

Although a key-pressing event t7 occurs while the state where the chord is being emitted is being maintained, keys for three notes which correspond to the key-pressing events t4, t5 and t6 are not released and the state where the chord is being emitted is maintained. In this case, the second-tone-based music sound is not emitted for a key-pressing event t7 and only a first-tone-based music sound for the normal sound which is indicated by a black solid line of the key-pressing event t7 is emitted (=does not meet the instruction condition).

Further, key-pressing events t8, t9 and t10 occur within the elapsed time T=, for example, 25 milliseconds that it is regarded that the keys are simultaneously pressed. However, keys for three notes which correspond to the key-pressing events t4, t5 and t6 are not released and the state where the chord is being emitted is maintained. Also in this case, the second-tone-based music sound for the chord is not emitted for the key-pressing events t8, t9 and t10 and only the first-tone-based music sound for the normal sound which is indicated by each black solid line of each of the key-pressing events t8, t9 and t10 is emitted (=does not meet the instruction condition).

Then, the key-pressing event t4 enters a key-released state (a white-circle timing in the key-pressing event t4) and sound emission of the second-tone-based music sounds for the chord in the key-pressing event t4 (a gray broken-line section in the key-pressing event t4) is terminated (enters a mute state). On the other hand, sound emission of the second-tone-based music sounds for the chords in the key-pressing events t5 and t6 (respective gray broken line sections in the key-pressing events t5 and t6) is maintained. Then, in a case where the key-pressing event t5 enters the key-released state (a white-circle timing in the key-pressing event t5), emission of the second-tone-based music sound (a gray broken line section of the key-pressing event t5) in the key-pressing event t5 is terminated (enters the mute state). On the other hand, emission of the second-tone-based music sound in the key-pressing event t6 (a gray broken line section of the key-pressing event t6) is maintained. Then, in a case where also the key-pressing event t6 enters the key-released state (a white circle timing of the key-pressing event t6), sound emission of the second-tone-based music sound in the key-pressing events t6 (the gray broken line section of the key-pressing event t6) is terminated (enters the mute state) and releasing of all the keys which correspond to the key-pressing events t4, t5 and t6 and with which the chord is played is completed and thereby the state where the chord is being emitted is released.

The state where the chord is being emitted is released and then a key-pressing event t11 occurs, the pitch C2 is stored and emission of a sound of the pitch C2 is once put on hold (a blanked solid-line section of the key-pressing event t11) and measurement of the elapsed time is again started. Then, key-pressing events t12, t13 and t14 occur within, for example, 25 milliseconds after occurrence of the key-pressing event t11, respective pitches E2, G2 and C3 are stored and emission of respective sounds of the pitches E2, G2 and C3 is once put on hold (respective blanked solid line sections of the key-pressing events T12, t13 and t14). As a result, the number of music sounds at a point in time that the time T (=, for example, 25 milliseconds) passes from the occurrence of the key-pressing event t11 reaches 4 and meets N (the number of sounds which establishes the chord playing)=, for example, 3 or more (=meets the instruction condition). Accordingly, for the key-pressing events t11, t12, t13 and t14, as indicated by gray broken lines, a second-tone-based music sound for the chord which is configured by four sounds of the pitches C2, E2, G2 and C3 is emitted (602 in FIG. 6). Then, the state where the chord is being emitted is set again.

Figure 7:
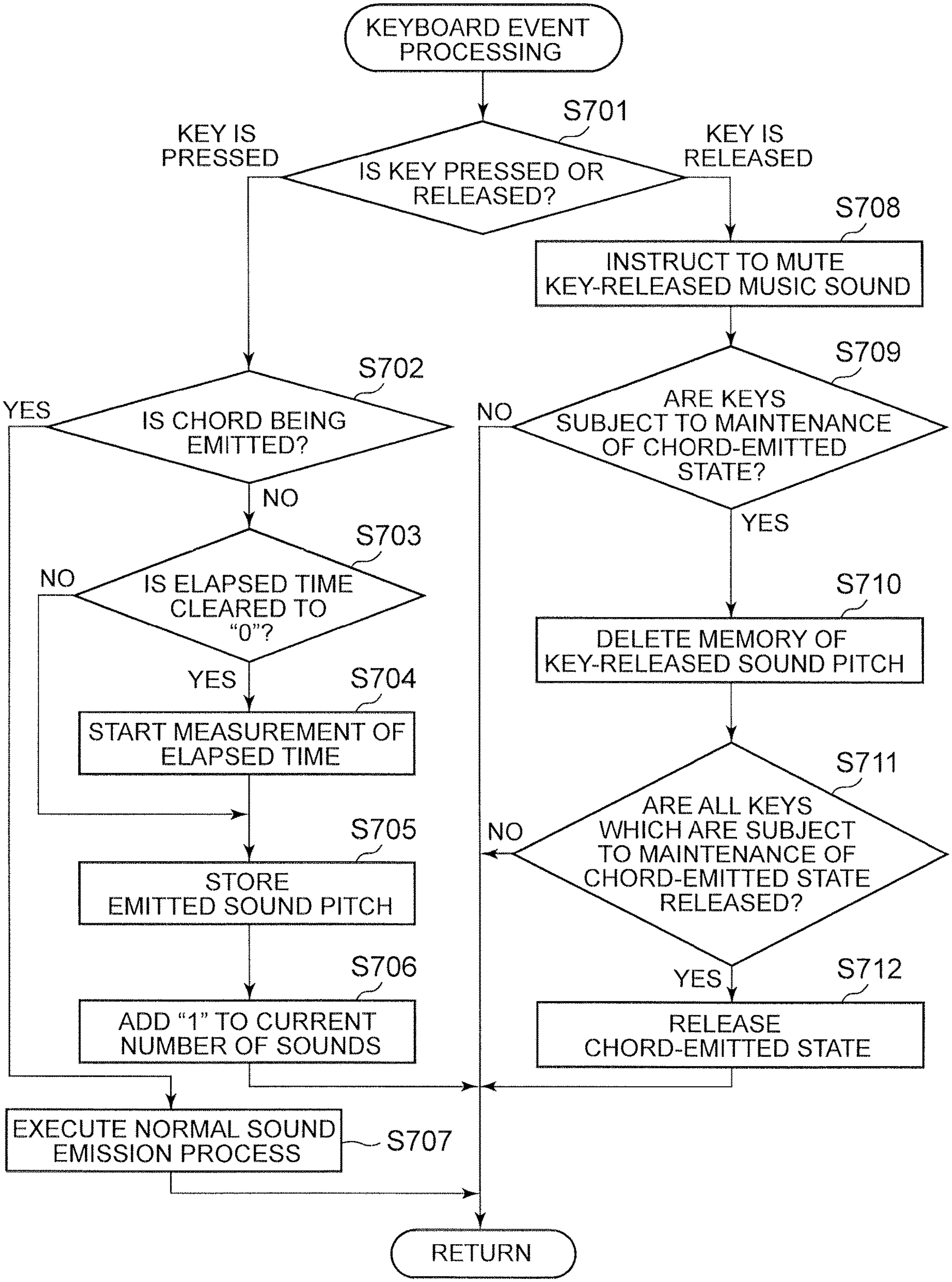
FIG. 7 is a flowchart illustrating one example of keyboard event processing which is executed in a tone modify mode.

FIG. 7 is a flowchart illustrating one example of keyboard event processing that the CPU 210 in FIG. 2 executes in a case where a tone modification mode is set by the user with the use of the tone modification function (3). As previously described, the keyboard event processing is executed on the basis of interruption which occurs in a case where the key scanner 206 in FIG. 2 detects a change in key-pressed/key-released state of each key on the keyboard 101 in FIG. 1. The CPU 201 executes the keyboard event processing, for example, by loading the keyboard event processing program which is stored in the ROM 202 into the RAM 203. Incidentally, the keyboard event processing program may be loaded from the ROM 202 into the RAM and may be normally stationed in the RAM 203 in a case where a power source of the electronic keyboard instrument 100 is turned on.

In the keyboard event processing which is illustrated in the flowchart in FIG. 7, the CPU 201 first decides that an interruption notice from the key scanner 206 indicates which event between the key-pressing event and the key-releasing event (step S701).

In a case where it is decided that the interruption notice indicates the key-pressing events in step S701, the CPU 201 does not yet issue the music sound emission instruction at this point in time and puts the sound emission on hold. In the operation explanatory diagram in FIG. 6, this state corresponds to the state where sound emission in the key-pressing events t1 and t2 is started at points of the left-end blanked black circles and then is put on hold (the blanked solid-line sections).

Next, the CPU 201 decides whether the current state is the state where the chord is being emitted (step S702). In this process, the CPU 201 decides whether the current state is the state where the chord is being emitted depending on whether a logical value of a predetermined variable (in the following, this variable will be called a "variable of the state where the chord is being emitted") which is to be stored into, for example, the RAM 203 in FIG. 2 is ON or OFF.

In step S702, in a case where it is decided that the current state is the state where the chord is being emitted, the CPU 201 does not execute a process for shifting to the state where the chord is being emitted and instructs to execute a process of emitting the normal sound with the first tone in the sound source LSI 204 in FIG. 2 (step S707). Then, the CPU 201 terminates this-time execution of the keyboard event processing which is illustrated in the flowchart in FIG. 7 and returns to execution of main program processing which is not particularly illustrated in the drawing. The main program processing corresponds to keyboard event processing which is executed in a case where the key-pressing events t7 to t10 in the operation explanatory diagram in FIG. 6 occur and only emission of the first-tone-based music sound is executed by the sound source LSI 204 in accordance with the instruction to emit the sound with the first tone in step S707.

In step S702, in a case where it is decided that the current state is not the state where the chord is being emitted, the CPU 201 decides whether the elapsed time which is taken to shift to the state where the chord is being emitted is cleared to "0" or not (step S703). The elapsed time is held, for example, as a value of the predetermined variable (in the following, this variable will be called an "elapsed-time variable") on the RAM 203 in FIG. 2.

In a case where it is decided that the elapsed time is cleared to "0" (a case where "YES" is decided in step S703), the CPU starts execution of an interruption process by the timer 210 and starts measurement of the elapsed time (step S704). This state corresponds to a process to be executed in a case where the key-pressing event t1, t4 or t11 occurs in the operation explanatory diagram in FIG. 6 and by execution of a process in step S704, measurement of the elapsed time which is taken to shift to the state where the chord is being emitted is started at a timing that the key-pressing event t1, t4 or t11 in FIG. 6 occurs.

In a case where it is decided that the elapsed time is not cleared to "0", (a case where "NO" is decided in step S704), since measurement of the elapsed time for shifting to the state where the chord is being emitted is already started, a process of starting measurement of the elapsed time in step S704 is skipped. This state corresponds to a process which is to be executed in a case where the key-pressing event(s) t2, t5 and t6, or t12, t13 and t14 in the operation explanatory diagram in FIG. 6 occur(s).

In a case where "NO" is decided in step S703 after execution of a process of starting measurement of the elapsed time which is taken for shifting to the state where the chord is being emitted in step S704 or after start of measurement of the elapsed time, the CPU 201 stores pitch data on a sound whose emission is instructed in this-time key-pressing event is stored into, for example, the RAM 203 as a cord emission candidate (step S705).

Then, the CPU 201 adds "1" which is a this-time sound emission increment to a value of the variable (in the following, will be called a "current variable of the number of sounds") which is held on, for example, the RAM 203 to be used for counting the current number of sounds whose keys are regarded to be pressed simultaneously and sets an obtained value as a new current value of the variable of the number of sounds (step S706). This current value of the variable of the number of sounds is counted in order to be compared with "N" (the number of sounds which establishes the chord playing) to be used for shifting to the state where the chord is being emitted in a case where the elapsed time T that the keys are regarded to be simultaneously pressed elapses in elapsed time monitoring processing which is illustrated in a flowchart in FIG. 9.

Then, the CPU 201 terminates execution of the this-time keyboard event processing which is illustrated in the flowchart in FIG. 7 and returns to execution of the not particularly illustrated main program processing.

A series of processes from the step S703 to step S706 is repetitively executed every time that the keyboard event processing is executed. Thereby, for example, in the operational example in FIG. 6, as preparation for shifting from a situation that the state where the chord is being emitted is released to the state where the chord is being emitted, storage of pitch data and counting-up of the current variable value of the number of sounds are performed in response to fresh occurrence of the key-pressing events t1 and t2, t4 to t6 or t11 to t14 within the elapsed time T from the timing that the key-pressing event t1, t4 or t11 occurs to the timing that it is regarded that the keys are simultaneously pressed.

In a case where it is decided that the interruption notice indicates a key-releasing event in step S701, the CPU 201 issues an instruction to mute the music sound which corresponds to the pitch data (the note number) which is contained in the interruption notice which indicates the key-releasing event and which is in the state of being emitted from the sound source LSI 204 to the sound source LSI 204 (step S708). By execution of the process in step S708, in the operational example in FIG. 6, the music sound which is being emitted from the sound source LSI 204 on the basis of occurrence of each of the key-pressing events t1 to t14 is muted at each right-end white circle timing (each black solid-line section or each gray broken-line section is terminated).

Then, the CPU 201 decides whether a key which is released is a key which is subject to maintenance of the state where the chord is being emitted (step S709). Specifically, the CPU 201 decides whether the pitch data on the released key is contained in the pitch data group on chord emission candidates (see step S705) which are stored in the RAM 203.

In a case where "NO" is decided in step S709, the CPU 201 terminates execution of the current keyboard event processing which is illustrated in the flowchart in FIG. 7 and returns to execution of the main program processing which is not particularly illustrated in the drawings.

In a case where YES" is decided in step S709, the CPU 201 erases memories of the pitch data on the released key(s) from the pitch data group (see step S705) on the chord emission candidates which are stored in the RAM 203 (step S710).

Then, the CPU 201 decides whether all the keys which are subject to maintenance of the state where the chord is being emitted are released (step S711). Specifically, the CPU 201 decides whether all the pitch data groups on the chord emission candidates which are stored in the RAM 203 are deleted.

In a case where "NO" is decided in step S711, the CPU 201 terminates execution of the current keyboard event processing which is illustrated in the flowchart in FIG. 7 and returns to execution of the main program processing which is not particularly illustrated in the drawings.

In a case where "YES" is decided in step S711, the CPU 201 releases the state where the chord is being emitted by changing the variable value of the state where the chord is being emitted which is stored in the RAM 203 to a value which indicates an OFF state (step S712). In the operational example in FIG. 6, this state corresponds to a state of a timing (a right-end white circle timing that a gray broken line section of the key-pressing event t6 terminates) that the second-tone-based music sound in the key-pressing event t6 is muted. In a case where the CPU 201 instructs the sound source LSI 204 to mute all the music sounds of chord configuring sounds which are being emitted in this way, the CPU 201 releases the state where the chord is being emitted.

Then, the CPU 201 terminates execution of the current keyboard event processing which is illustrated in the flowchart in FIG. 7 and returns to execution of the main program processing which is not particularly illustrated in the drawings.

Figure 8:
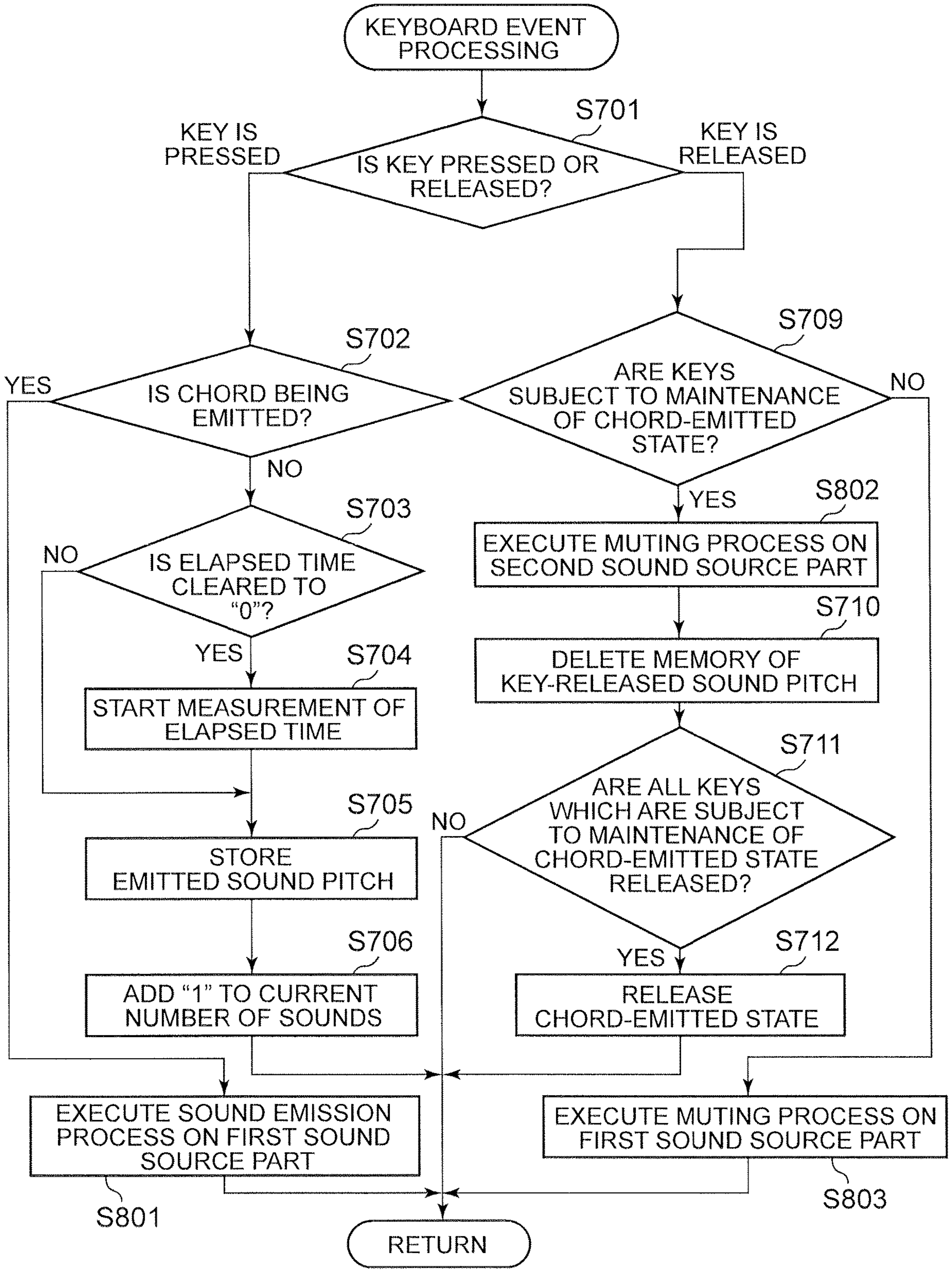
FIG. 8 is a flowchart illustrating one example of the keyboard event processing which is executed in a tone switch mode.

FIG. 8 is a flowchart illustrating one example of the keyboard event processing that the CPU 201 in FIG. 2 executes in a case where a tone switch mode which is set by the tone switching function (4) is designated by the user. The keyboard event processing is executed on the basis of interruption which occurs in a case where the scanner 206 in FIG. 2 detects a change of the key-pressing/key-releasing state on the keyboard 101 in FIG. 1 similarly to the keyboard event processing in FIG. 7. The keyboard event processing is processing that, for example, the CPU 201 loads a keyboard event processing program which is stored in the ROM 202 to the RAM 203 and executes the loaded keyboard event processing program. Incidentally, the keyboard event processing program may be loaded from the ROM 202 to the RAM 203 and may be stationed in the RAM 203 in a case where a power source of the electronic keyboard instrument 100 is turned on.

In the keyboard event processing which is illustrated in the flowchart in FIG. 8, step numbers which are the same as the step numbers in the case of the tone modify mode in FIG. 7 are assigned to processes which are the same as the processes in FIG. 7.

The processing of the flowchart in FIG. 8 is different from the processing of the flowchart in FIG. 7 in the points which will be described in the following. As the first point, in the flowchart in FIG. 8, in a case where the CPU 201 decides that the current state is the state where the chord is being emitted in step S702, the CPU 201 typically executes the sound emission process on the first sound source part block 301 (see FIG. 3) which is allocated to the normal sound in the sound source LSI 204 (step S801) (see the explanation of the tone switching function (4)).

As the second point that the processing of the flowchart in FIG. 8 is different from processing of the flowchart in FIG. 7, in a case where it is decided that the key which is released in step S709 is the key which is subject to the state where the chord is being emitted in FIG. 8, the CPU 201 issues an instruction to mute the music sound of the sounds which configure the chord which is being emitted to the second sound source part block 302 (see FIG. 3) that the chord configuring sounds are allocated (step S802) in the sound source LSI 204, in place of the muting process in step S708 in FIG. 7.

As the third point that the processing of the flowchart in FIG. 8 is different from the processing of the flowchart in FIG. 7, in FIG. 8, in a case where it is decided that the key which is released in step S709 is not the key which is subject to the state where the chord is being emitted, the CPU 201 issues an instruction to mute the music sound which is being emitted to the first sound source part block 301 (see FIG. 3) that the normal sound is allocated in the sound source LSI 204 (step S803), in place of the muting process in step S708 in FIG. 7.

Figure 9:
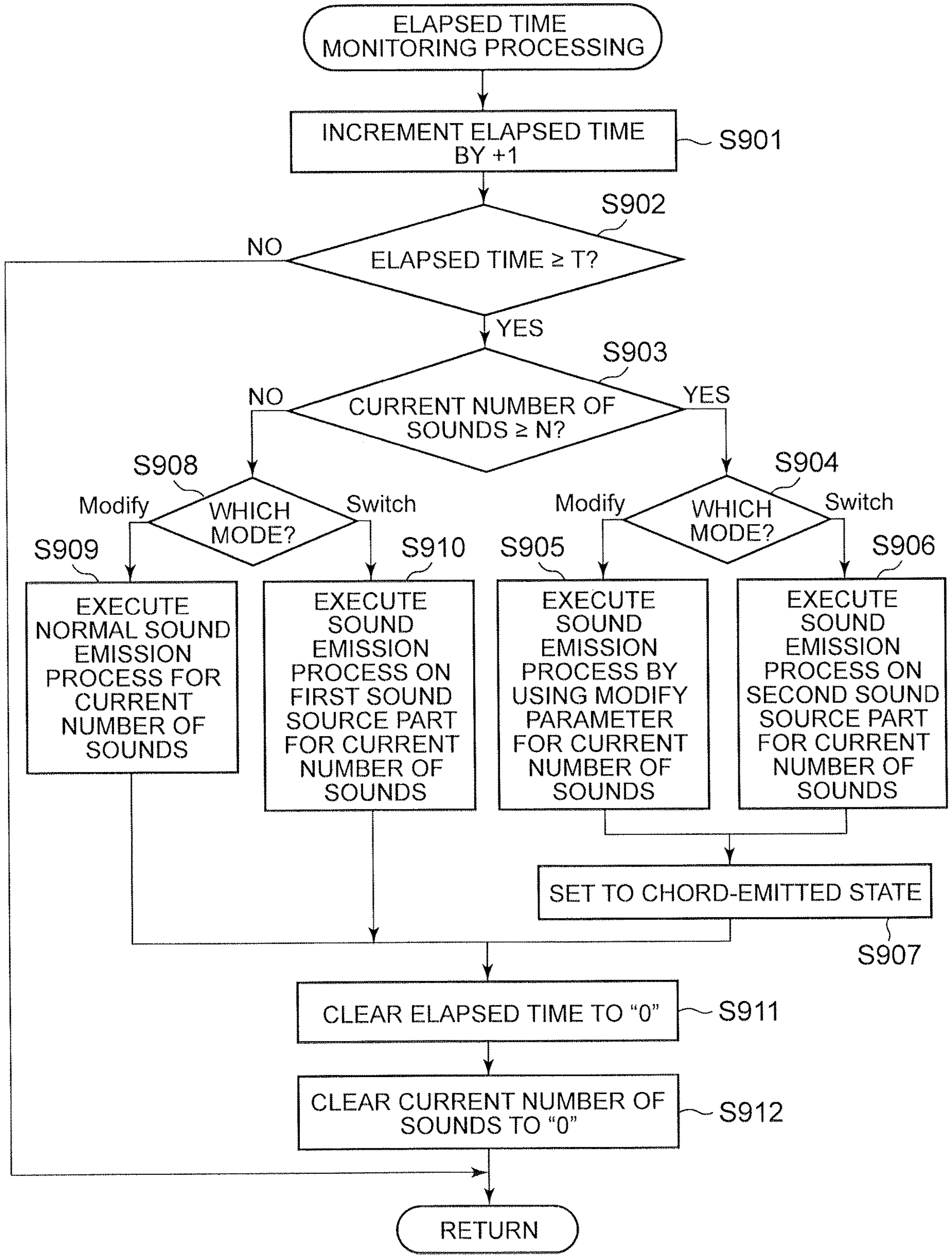
FIG. 9 is a flowchart illustrating one example of elapsed time monitoring processing.

FIG. 9 is a flowchart illustrating one example of elapsed time monitoring processing that the CPU 201 in FIG. 2 executes. The elapsed time monitoring processing is executed on the basis of timer interruption which occurs, for example, every one millisecond by the timer 210 in FIG. 2. The elapsed time monitoring processing is processing that, for example, the CPU 201 loads an elapsed time monitoring processing program which is stored in the ROM 202 to the RAM 203 and executes the loaded elapsed time monitoring processing program. Incidentally, the elapsed time monitoring processing program may be loaded from the ROM 202 to the RAM and then may be stationed in the RAM 203 in a case where the power source of the electronic keyboard instrument 100 is turned on.

In the elapsed time monitoring processing which is illustrated in the flowchart in FIG. 9, first, the CPU 201 increments (+1) a value of an elapsed time variable which is stored in the RAM 203 (step S901). The value of the elapsed time variable is cleared to a value "0" in step S704 in FIG. 7 or FIG. 8 or in step S911 which will be described later. Consequently, it means that the value of the elapsed time variable indicates a time which is elapsed in milliseconds from a point in time that the elapsed time variable value is cleared to "0". As aforementioned, in the operation explanatory diagram in FIG. 6, the elapsed time is cleared to "0" at each timing (each black circle timing) that each of the key-pressing events t1, t3, t4 and t11 occurs and then measurement of the elapsed time for shifting to the state where the chord is being emitted is started.

Next, the CPU 201 decides whether the value of the elapsed time variable exceeds the elapsed time T that it is regarded that two or more keys are simultaneously pressed (step S902).

In a case where "NO" is decided in step S902, that is, in a case where the value of the elapsed time variable is less than the elapsed time T that it is regarded that two or more keys are simultaneously pressed, the CPU 201 terminates execution of this-time elapsed time monitoring processing which is illustrated in the flowchart in FIG. 9 and returns to execution of the main program processing which is not particularly illustrated in order to further accept occurrence of the key-pressing events which are described in the flowchart in FIG. 7 or FIG. 8.

In a case where "YES" is decided in step S902, that is, the value of the elapsed time variable exceeds the elapsed time T that it is regraded that two or more keys are simultaneously pressed, the CPU 201 decides whether the current sound-number (the number of sounds) variable value (see step S706 in FIG. 7 or 8) which is stored in the RAM 203 is more than N (the number of sounds (for example, three sounds)) which establishes the chord playing (step S903).

In a case where "YES" is decided in step S903, the CPU 201 decides whether the currently set mode is the tone modification mode which is set by the tone modification function (3) or the tone switching mode which is set by the tone switching function (4) (step S904).

In a case where the current mode is the tone modification mode (denoted by "Modify" in FIG. 9) which is set by the tone modification function (3), the CPU 201 issues an instruction to emit a second-tone-based music sound which corresponds to the pitch data (see step S705 in FIG. 7 or FIG. 8) for the number of sounds that the current sound-number variable value which is stored in the RAM 203 indicates to the first sound source part block 301 (in a case of the Upper area) or the second sound source part block 302 (in a case of the Lower region) in the sound source LSI 204 (step S905) (see the description on the tone modification function (3)).

In a case where the current mode is the tone switching mode (denoted by "Switch" in FIG. 9) which is set by the tone switching function (4), the CPU 201 issues an instruction to emit a second-tone-based music sound which corresponds to the pitch data for the number of sounds that the current sound-number variable value which is stored in the RAM 203 indicates to the second sound source part block 302 in the sound source LSI 204 (step S906) (see the description on the tone switching function (4)).

After execution of the process in step S905 or S906, the CPU 201 sets the variable value for the state where the chord is being emitted which is stored in the RAM 203 to a value which indicates an ON state and sets the state where the chord is being emitted (step S907).

As a result of execution of processes in step S905 and step S906, in the operational example in FIG. 6, immediately after occurrence of the key-pressing event t6, music sound output data 214 on the second-tone-based music sound for the chord which corresponds to the pitch data for three sounds of the key-pressing events t4, t5 and t6 is output from the sound source LSI 204 in respective gray broken-line sections which are parts of the key-pressing events t4, t5 and t6 in FIG. 6. Likewise, immediately after occurrence of the key-pressing event t14, the music sound output data 214 on the second-tone-based music sound for the chord which corresponds to the pitch data for four sounds of the key-pressing events t11, t12, t13 and t14 is output from the sound source LSI 204 in respective gray broken-line sections which are parts of the key-pressing events t11, t12, t13 and t14 in FIG. 6.

In a case where it is decided that the current sound-number variable value which is stored in the RAM 203 is not more than N (the number of sounds which establishes the chord playing) in step S903, the CPU 201 decides whether the currently set mode is the tone modification mode which is set by the tone modification function (3) or the tone switching mode which is set by the tone switching function (4) (step S908).

In a case where the current mode is the tone modification mode which is set by the tone modification function (3), the CPU 201 issues an instruction to emit the first-tone-based music sound which indicates the normal sound which corresponds to the pitch data for the number of sounds that the current sound-number variable value which is stored in the RAM 203 indicates to the first sound source part block 301 (in the case of the Upper area) or the second sound source part block 302 (in the case of the Lower area) in the sound source LSI 204 (step S909).

In a case where the current mode is the tone switching mode which is set by the tone switching function (4), the CPU 201 issues an instruction to emit the first-tone-based music sound which corresponds to the pitch data for the number of sounds that the current sound-number variable value which is stored in the RAM 203 indicates to the first sound source part block 301 that the normal sound is allocated in the sound source LSI 204 (step S910).

As a result of execution of the processes in step S909 and step S910, in the operational example in FIG. 6, after occurrence of the key-pressing event t2, the number of sounds that the current sound-number variable value indicates is not more than "N" at a point in time that T (sec) elapses. Accordingly, the music sound output data 214 on the first-tone-based music sound for the normal sound which corresponds to the pitch data for two sounds of the key-pressing events t1 and t2 is output from the sound source LSI 204 in the black solid-line sections which follow blanked solid-line sections of the key-pressing events t1 and t2 in FIG. 6.

Chord emission is instructed in step S905 or S906 and the state where the chord is being emitted is set in step S907 or it is decided that the current sound-number variable value is less than "N". Then, emission of the first-tone-based music sound for the normal sound is instructed in step S908 or S910. Then, the CPU 201 clears the elapsed time variable value which is stored in the RAM 203 to "0" (step S911).

Further, the CPU 201 clears the current sound-number variable value which is stored in the RAM 203 to "0" (step S912).

Then, the CPU 201 terminates execution of the elapsed time monitoring processing which is illustrated in the flowchart in FIG. 9 and returns to execution of the main program processing which is not particularly illustrated.

In the explanatory diagram of the operation in FIG. 6, in a case where the key-pressing event t3 occurs following the key-pressing events t1 and t2, in the elapsed time monitoring processing, at a point in time that the time which elapses from the timing that the key-pressing event t1 occurs is decided to be more than the elapsed time T within which it is regarded that the keys are simultaneously pressed (the point in time that "YES" is decided in step S902), it is decided that the current sound-number variable value (=2 (corresponding to the key-pressing events t1 and t2)) does not reach N (=3, the number of sounds which establishes the chord playing) ("NO" is decided in step S903). As a result, a second-tone-based music sound emission process (step S905) and a process of setting to the state where the chord is being emitted (step S907) are not executed, the elapsed time variable value is cleared to "0" in step S911 and the current sound-number variable value is cleared to "0" in step S912. As a result, in the processing in the flowchart in FIG. 7 or FIG. 8, it is decided that the state where the chord is being emitted is released in step S702, "YES" is decided in step S703 and a process in step S704 is executed. Thereby, a process of measuring the elapsed time for shifting from the situation that the state where the chord is being emitted is released to the state where the chord is being emitted is started again from the point in time that the key-pressing event t6 occurs. That is, in a case where "N" (the number of sounds which establishes the chord playing is not met when the elapsed time T that the keys are regarded to be simultaneously pressed elapses, a condition of shifting again from the situation that the state where the chord is being emitted is released to the state where the chord is being emitted are decided with the key-pressing event (t6) which occurs immediately after occurrence of the key-pressing events t4 and t5 being set as the starting point.

As described above, in one embodiment of the present disclosure, the setting of tone parameters of sounds which are respectively emitted with the first tone in a case of key-pressing which is decided that the normal sound is emitted and with the second tone in a case of simultaneous key-pressing which is decided that the chord is being emitted or the selection of the first sound source part block 301 or the second sound source part block 302 is made in advance. Then, it is decided whether the chord playing is carried out in accordance with the number of keys which are pressed on the keyboard 101 which is played by the user and the time intervals that the plurality of keys is pressed and thereby only the group of notes which correspond to key-pressing which is decided as the chord playing is brought into the state where the chord is being emitted so as to emit the music sound with the second tone which is different from the first tone for the normal sound. Accordingly, it becomes possible to emit the sound with the single tone and to emit the sound by mutually superposing a plurality of tones with no need of restrictions on the key area.

According to one embodiment of the present disclosure, it becomes possible for the user to automatically add sound effects, tone changing and so forth for the chord only to an intended music sound simply by naturally playing the keyboard 101 with no need of performing a specific operation. As a result, it becomes possible for the user to concentrate on playing not compromising with the playing or the music sound.

In addition to one embodiment, it is also possible to implement such embodiments as follows. 1. A second-tone-based chord playing function is enabled only in specific key areas. For example, the second-tone-based chord playing function is enabled in C3 and succeeding key areas. 2. The second-tone-based chord playing function is enabled only in a specific velocity area. For example, the second-tone-based chord playing function is enabled only for a sound of an intensity which is less than, for example, 64 in velocity value. 3. In a case where solo playing (non-chord playing) is recognized, the second-tone-based chord playing function is not enabled for a definite period of time. For example, while the solo playing which does not meet the condition of shifting to the state where the chord is being emitted is being carried out, wait and see the situation for, for example, three seconds so as to regard that solo playing as part of solo playing, without shifting to the state where the chord is being emitted even in a case where the chord is played for a moment. 4. In a case where the legato playing is recognized, the second-tone-based chord playing function is enabled.

Although one example that the second-tone-based chord playing function is implemented on the electronic keyboard instrument 100 is described in one embodiment of the present disclosure, it is also possible to implement the chord playing function on electronic stringed instruments such as, for example, a guitar synthesizer, a guitar controller and so forth in addition to the electronic keyboard instrument 100. In addition, the chord playing function may not necessarily be implemented on an instrument which is exclusively used as a musical instrument and may be also implemented on an electronic instrument and so forth which are configured to make it possible to display a keyboard on, for example, a touch display. Further, the chord playing function may be also implemented on an electronic instrument which makes it possible to control an external sound source by being connected with the external sound source. Processors of these respective electronic instruments may execute the keyboard event processing and the elapsed time monitoring processing.

Although, in one embodiment, one example that the tone is changed in a case of emitting the music sound in units of music playing operations simply by naturally playing the instrument with no need of performing a specific operation for the user, an object to be changed is not limited to the tone. For example, in a case of emitting the music sound, sound-emission related forms such as a volume, an accent and so forth of the emitted sound may be changed.

Although, in one embodiment, one example that the tone is changed with the chord playing operation being set as an object is described, the playing operation whose tone is to be changed is not limited to the chord playing operation. For example, the tone may be changed with a playing operation that two or more playing operators are operated in a plurality of the playing operators being as the object.

Although, in one embodiment, the control program is stored in the ROM 202, a storage medium is not limited to the ROM 202 and the control program may be also stored in removable storage media such as, for example, an USB (Universal Serial Bus) memory, a CD (Compact Disc), a DVD (Digital Versatile Disc) and so forth and may be stored in a server. The electronic keyboard instrument 100 may acquire the control program from a storage medium such as the above storage media and may acquire the control program from the server over a network.

Although one embodiment and advantages of the present disclosure are described in detail, it is possible for a person skilled in the art to make various alterations, additions and omissions without deviating from the range of the present disclosure which is definitely described in Patent Claims.

In addition, the present disclosure is not limited to the above embodiment and it is possible to alter the invention in a variety of ways within the range not deviating from the gist of the present disclosure in an implementation phase. In addition, the functions which are executed in the above embodiment may be implemented by being appropriately combined with one another to a maximum extent. Various stages are contained in the above embodiment and it is possible to extract various inventions by appropriately combining a plurality of constitutional elements which is disclosed with one another. For example, in a case where the effect is obtained irrespective of deletion of some constitutional elements from all the constitutional elements which are described in the embodiment, a configuration from which some constitutional elements are deleted may be possibly extracted as the disclosure.

What is claimed is:

1. An electronic instrument comprising:

music-playing operators each of which designates pitch data in accordance with a music-playing operation; and at least one processor which instructs a sound source which generates music sounds to emit sounds, wherein the at least one processor:

in a case where the music-playing operation meets a first instruction condition that a plurality of the music-playing operators are not operated within a set time, instructs the sound source to emit the sound in a first sound emission form which corresponds to pitch data which meets the first instruction condition which is designated in accordance with the music-playing operation, in a case where the music-playing operation meets a second instruction condition that a plurality of the music-playing operators are operated within the set time, instructs the sound source to emit a sound in a second sound-emission form which is different from the sound which is emitted in the first sound-emission form and which corresponds to pitch data which meets the second instruction condition which is designated in accordance with the music-playing operation, in accordance with the plurality of the music-playing operators which are operated within the set time, and after the elapse of the set time, in a case where another music-playing operator is not operated in a time period from when a new operation on the music-playing operator to which sound emission is not yet instructed is detected and the new operation is started to when the set time elapses, instructs to emit a sound in the first sound emission form in response to the operation on the music-playing operator to which sound emission is not yet instructed.

2. The electronic instrument according to claim 1, wherein the at least one processor:

in the case where the music-playing operation meets the first instruction condition, instructs the sound source to emit a sound with a first tone in the first sound-emission form, and in a case where the music-playing operation meets the second instruction condition, instructs the sound source to emit a sound with a second tone in the second sound-emission form.

3. The electronic instrument according to claim 1, wherein the set time is a time which lasts for a predetermined period of time from a timing that the operation on the music-playing operator to which sound emission is not yet instructed is detected.

4. The electronic instrument according to claim 1, wherein:

the first instruction condition is that a plurality of the music-playing operators which combine to configure a chord are not operated within the set time, and the second instruction condition is that a plurality of the music-playing operators which combine to configure a chord are operated within the set time.

5. The electronic instrument according to claim 1, wherein the at least one processor maintains sound emission in the second sound emission form while a muting operation is not being performed on another music-playing operator among the plurality of the music-playing operators which are operated for sound emission in the second sound emission form, in spite of performing the muting operation on at least one music-playing operator among the plurality of music-playing operators which are operated for sound emission in the second sound emission form while the sound is being emitted in the second sound emission form.

6. The electronic instrument according to claim 1, wherein the at least one processor:

instructs to mute the sound which is emitted in the second sound emission form by performing a muting operation on the plurality of the music-playing operators which are operated for sound emission in the second sound emission form while the sound is being emitted in the second sound emission form, and after instructing to mute the sound, in a case where a number of the music-playing operators the operations of which are started reaches a set number which is two or more in the time period from when the new operation on the music-playing operator to which sound emission is not yet instructed is detected and the new operation is started to when the set time elapses, instructs to emit a sound in the second sound emission form which corresponds to the music-playing operators the operations of which are started.

7. The electronic instrument according to claim 2, wherein the sound source freely switches between (i) a first mode, in which sound emission is performed with the second tone which is generated by adding a sound effect to a sound which is emitted with the first tone, and (ii) a second mode, in which sound emission is performed with the second tone by using a sound source part block which is different from a sound source part block which corresponds to sound emission which is performed with the first tone.

8. A sound emission instructing method for use in an electronic instrument, the method comprising:

in a case where a music-playing operation on music-playing operators of the electronic instrument meets a first instruction condition that a plurality of the music-playing operators are not operated within a set time, instructing a sound source to emit a sound in a first sound emission form which corresponds to pitch data which meets the first instruction condition which is designated in accordance with the music-playing operation;

in a case where the music-playing operation meets a second instruction condition that a plurality of the music-playing operators are operated within the set time, instructing the sound source to emit a sound in a second sound emission form which is different from the sound which is emitted in the first sound emission form and which corresponds to pitch data which meets the second instruction condition which is designated in accordance with the music-playing operation, in accordance with the plurality of the music-playing operators which are operated within the set time, and after the elapse of the set time, in a case where another music-playing operator is not operated in a time period from when a new operation on the music-playing operator to which sound emission is not yet instructed is detected and the new operation is started to when the set time elapses, instructs to emit a sound in the first sound emission form in response to the operation on the music-playing operator to which sound emission is not yet instructed.

9. A non-transitory computer-readable recording medium storing a program thereon, the program being executable by a computer in an electronic instrument to control the computer to perform processes comprising:

in a case where a music-playing operation on music-playing operators of the electronic instrument meets a first instruction condition that a plurality of the music-playing operators are not operated within a set time, instructing a sound source to emit a sound in a first sound emission form which corresponds to pitch data which meets the first instruction condition which is designated in accordance with the music-playing operation;

in a case where the music-playing operation meets a second instruction condition that a plurality of the music-playing operators are operated within the set time, instructing the sound source to emit a sound in a second sound emission form which is different from the sound which is emitted in the first sound emission form and which corresponds to pitch data which meets the second instruction condition which is designated in accordance with the music-playing operation, in accordance with the plurality of the music-playing operators which are operated within the set time, and after the elapse of the set time, in a case where another music-playing operator is not operated in a time period from when a new operation on the music-playing operator to which sound emission is not yet instructed is detected and the new operation is started to when the set time elapses, instructs to emit a sound in the first sound emission form in response to the operation on the music-playing operator to which sound emission is not yet instructed.

10. An electronic instrument comprising:

music-playing operators each of which designates pitch data in accordance with a music-playing operation; and at least one processor which instructs a sound source which generates music sounds to emit sounds, wherein the at least one processor:

in a case where the music-playing operation meets a first instruction condition, instructs the sound source to emit the sound with a first tone in a first sound emission form which corresponds to pitch data which meets the first instruction condition which is designated in accordance with the music-playing operation; and in a case where the music-playing operation meets a second instruction condition which is different from the first instruction condition, instructs the sound source to emit a sound with a second tone in a second sound-emission form which is different from the sound which is emitted in the first sound-emission form and which corresponds to pitch data which meets the second instruction condition which is designated in accordance with the music-playing operation, and wherein the sound source freely switches between (i) a first mode, in which sound emission is performed with the second tone which is generated by adding a sound effect to a sound which is emitted with the first tone, and (ii) a second mode, in which sound emission is performed with the second tone by using a sound source part block which is different from a sound source part block which corresponds to sound emission which is performed with the first tone.

* * * * *